United States Patent [19]

Hara

[11] Patent Number: 4,511,906

[45] Date of Patent: Apr. 16, 1985

[54] INK LIQUID RESERVOIR IN AN INK JET SYSTEM PRINTER

[75] Inventor: Takafumi Hara, Kyoto, Japan

[73] Assignee: Sharp Kabushiki Kaisha, Osaka, Japan

[21] Appl. No.: 539,251

[22] Filed: Oct. 5, 1983

[30] Foreign Application Priority Data

| | | | |
|---|---|---|---|
| Oct. 13, 1982 | [JP] | Japan | 57-154575[U] |
| Nov. 22, 1982 | [JP] | Japan | 57-176868[U] |

[51] Int. Cl.[3] .............................................. G01D 15/18

[52] U.S. Cl. ............................ 346/140 R; 346/140 A

[58] Field of Search ...................... 346/140 IJ, 140 PD

[56] References Cited

U.S. PATENT DOCUMENTS

| | | | |
|---|---|---|---|
| 3,953,862 | 4/1976 | Amberntsson et al. | 346/140 PD |
| 4,053,902 | 10/1977 | Skafvenstedt et al. | 346/140 IJ |
| 4,074,284 | 2/1978 | Dexter et al. | 346/140 PD |
| 4,084,165 | 4/1978 | Skafvenstedt et al. | 346/140 IJ |
| 4,156,244 | 5/1979 | Erikson et al. | 346/140 IJ |
| 4,162,501 | 7/1979 | Mitchell et al. | 346/140 PD |
| 4,183,031 | 1/1980 | Kyser et al. | 346/140 PD |
| 4,253,103 | 2/1981 | Heinzl et al. | 346/140 PD |
| 4,419,678 | 12/1983 | Kasugayama et al. | 346/140 PD |

*Primary Examiner*—George H. Miller, Jr.
*Attorney, Agent, or Firm*—Birch, Stewart, Kolasch & Birch

[57] ABSTRACT

An ink jet system printer of the ink-on-demand type includes an ink liquid reservoir for supplying ink liquid to a printer head by means of the capillarity. An ink cartridge is removably mounted on the ink liquid reservoir in order to maintain the ink liquid level in the ink liquid reservoir at a desired level. An opening is formed in the ceiling wall of the ink liquid reservoir for ensuring smooth ink supply from the ink liquid reservoir to the printer head. A porous capping member is disposed in the opening to minimize the evaporation of the ink liquid. A thin gap is formed in the porous capping member so that the air disposed in the ink liquid reservoir communicates to the ambience.

6 Claims, 2 Drawing Figures

INK LIQUID RESERVOIR IN AN INK JET SYSTEM PRINTER

BACKGROUND OF THE INVENTION

1. Field of the Invention

The present invention relates to an ink liquid supply system in an ink jet system printer. The present invention relates, more particularly, to an ink liquid reservoir included in an ink jet system printer of the printer of the ink-on-demand type.

2. Description of the Prior Art

An ink jet system printer of the ink-on-demand type generally includes an ink liquid reservoir mounted on a carriage which supports a printer head. An ink cartridge is removably disposed on the ink liquid reservoir in order to maintain the amount of ink liquid at a desired level in the ink liquid reservoir. The printer head includes a nozzle portion which communicates with the ink liquid reservoir so that the ink liquid is supplied from the ink liquid reservoir to the nozzle portion by means of the capillarity.

The ink reservoir is provided with an opening formed in the ceiling wall thereof so as to ensure stable ink liquid supply from the ink liquid reservoir to the nozzle portion. In the conventional system, the opening is a small opening so as to minimize the evaporation of the ink liquid through the opening.

However, there was a possibility that the small opening is blocked by the ink liquid when the ink cartridge is secured to the ink liquid reservoir because the pressure is increased in the ink liquid reservoir when the ink cartridge is secured to the ink liquid reservoir. Moreover, there was a possibility that the small opening is blocked by the ink liquid dropped from the ink cartridge when the ink cartridge is demounted from the ink liquid reservoir. The blocking of the small opening precludes an accurate operation of the ink jet system printer.

OBJECTS AND SUMMARY OF THE INVENTION

Accordingly, an object of the present invention is to provide a novel ink liquid supply system for use in an ink jet system printer of the ink-on-demand type.

Another object of the present invention is to provide an ink liquid reservoir which ensures stable operation of an ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiments of the present invention, a large opening is formed in the ceiling wall of an ink liquid reservoir. The large opening is capped by a cap made of porous material, thereby minimizing the evaporation of the ink liquid from the ink liquid reservoir. A thin gap is formed in the cap so as to communicate the air contained in the ink liquid reservoir to the ambient air. The porous cap functions to absorb the ink liquid when the ink liquid drops on the large opening, thereby preventing the thin gap from being blocked by the ink liquid.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENT

Figure 1:
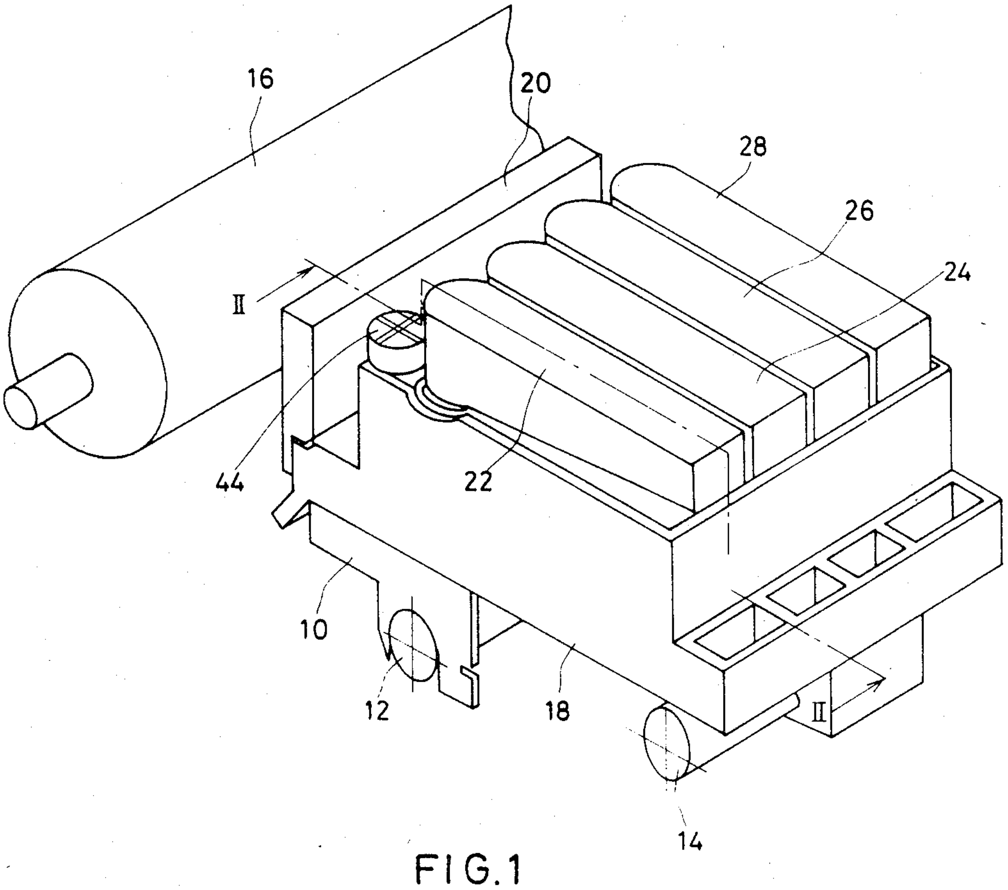
FIG. 1 is a perspective view of an ink jet system printer of the ink-on-demand type which includes an embodiment of an ink liquid reservoir of the present invention.

An ink jet system printer of the ink-on-demand type includes a carriage 10 slidably mounted on a pair of slide bars 12 and 14. The carriage 10 is connected to a drive mechanism (not shown) so that the carriage 10 is driven to travel in the lateral direction along a platen 16. An ink liquid reservoir 18 in mounted on the carriage 10. Furthermore, a printer head 20 is mounted on the carriage 10 to confront the platen 16.

FIG. 1 shows a color printer which emits ink droplets of different four colors, yellow magenta, cyan and black. Thus, the ink liquid reservoir 18 is divided into four chambers. Each chamber has the same construction. Four ink cartridges 22, 24, 26 and 28 are removably mounted on the ink liquid reservoir 18. The first ink cartridge 22, containing yellow ink, communicates to the first chamber of the ink liquid reservoir 18. The second ink cartridge 24, containing magenta ink, communicates to the second chamber of the ink liquid reservoir 18. The third ink cartridge 26, containing cyan ink, communicates to the third chamber of the ink liquid reservoir 18. The fourth ink cartridge 28, containing black ink, communicates to the fourth chamber of the ink liquid reservoir 18. The printer head 20 includes at least four nozzles, each nozzle being communicated to the respective chambers of the ink liquid reservoir 18 so that the ink liquid is supplied from the ink liquid reservoir 18 to the corresponding nozzle by means of the capillarity.

A typical construction of the ink jet system printer of the ink-on-demand type is disclosed in copending application, "COLOR INK JET SYSTEM PRINTER", Ser. No. 488,827, filed on April 26, 1983 by Yoshio KANAYAMA and assigned to the same assignee as the present application. German counterpart was filed on April 29, 1983 (No. P 33 15 514.3).

Figure 2:
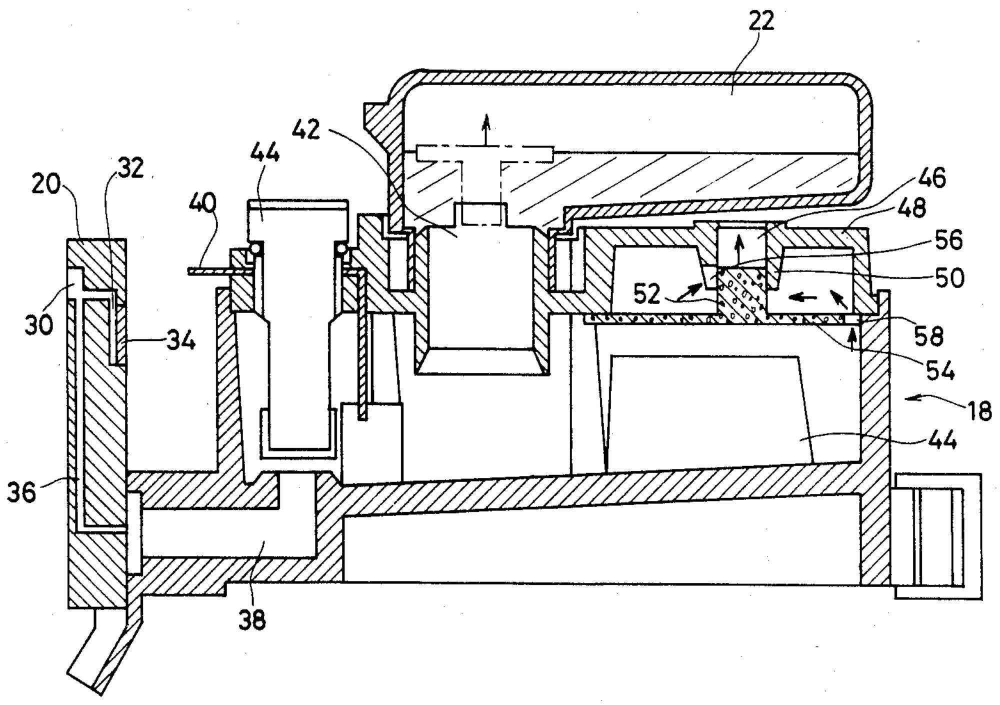
FIG. 2 is a sectional view taken along line II—II of FIG. 1.

FIG. 2 shows the first ink cartridge 22, the first chamber of the ink liquid reservoir 18, and a nozzle 30 included in the printer head 20. That is FIG. 2 shows the construction related to the yellow printing. Remaining three chambers have the same construction and, therfore, the description thereof is omitted for the purpose of simplicity.

The printer head 20 includes the nozzle 30, a pressure chamber 32, and a piezo (electro-mechanical) element 34 secured to the pressure chamber 32. A passage 36 is formed in the printer head 20, which communicates the ink liquid reservoir 18 through a conduit 38. In response to the print information signal, a voltage signal is applied to the piezo element 34 to emit the ink droplet from the nozzle 30 toward record receiving paper supported by the platen 16. A level sensor 40 is provided for detecting the amount of the ink liquid contained in the ink liquid reservoir 18.

The ink cartridge 22 is removably mounted on the ink liquid reservoir 18 so that an ink outlet of the ink cartridge 22 is engaged in an ink inlet 42 of the ink liquid reservoir 18. The ink liquid reservoir 18 communicates to the conduit 38 via a valve 44. A damping wall 44 is disposed in the ink liquid reservoir 18 so as to damper the movement of the ink liquid in the ink liquid reservoir 18 when the carriage 10 performs the reciprocating movement on the pair of slide bars 12 and 14.

The ink liquid reservoir 18 of the present invention is provided with a considerably large opening 46 formed in a ceiling wall 48 of the ink liquid reservoir 18 for discharging the air from the ink liquid reservoir 18. A periphery wall 50 of the opening 46 is extruded into the ink liquid reservoir 18. A capping member 52 is disposed in the ink liquid reservoir 18, and is engaged into the opening 46. The capping member 52 is made of porous material such as sintered stainless steel. The capping member 52 is integral with a flat plate 54 which substantially extends over the entire width of chamber of the ink liquid reservoir 18. A thin gap 56 is formed in the capping member 52 or in the periphery wall 50 in order to communicate the inside of the ink liquid reservoir 18 to the ambience. A small aperture 58 is formed in the flat plate 54 to allow the air flow therethrough.

When the ink cartridge 22 is mounted on the ink liquid reservoir 18, there is a possibility that a portion of the ink liquid contained in the ink liquid reservoir 18 flows toward the large opening 46 due to the pressure increase in the ink liquid reservoir 18. Such flow of the ink liquid is blocked by the flat plate 54. Furthermore, the pressure in the ink liquid reservoir 18 is maintained at a desired level because the air disposed in the ink liquid reservoir 18 is communicated to the ambience through the aperture 58 and the thin gap 56. Accordingly, the smooth ink liquid supply from the ink liquid reservoir 18 to the nozzle 30 is ensured.

Even when the ink liquid drops on the large opening 46 at a time when the ink cartridge 22 is demounted from the ink liquid reservoir 18, the ink liquid is absorbed by the porous capping member 52. Thus, the thin gap 56 will not be blocked by the ink liquid. Moreover, the evaporation of the ink liquid is minimized by the provision of the capping member 52 and the flat plate 54.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink liquid supply system for an ink jet system printer which includes a printer head mounted on a carriage, comprising:

an ink liquid reservoir mounted on said carriage, said ink liquid reservoir having a ceiling wall provided with an opening;

an ink cartridge removable mounted on said ink liquid reservoir;

a capping member engaged in said opening formed in said ceiling wall of said ink liquid reservoir; and a thin gap formed between said capping member and said ceiling wall of said ink liquid reservoir.

2. The ink liquid supply system of claim 1, wherein said capping member is made of porous material, and said thin gap includes a groove formed in said capping member.

3. An ink jet system printer of the ink-on-demand type comprising:

a reciprocating carriage;

a printer head mounted on said reciprocating carriage, said printer head including a nozzle for emitting ink droplets;

an ink liquid reservoir mounted on said reciprocating carriage, said ink liquid reservoir having a ceiling wall provided with an opening;

conduit means for supplying ink liquid from said ink liquid reservoir to said nozzle by means of the capillarity;

an ink cartridge removably mounted on said ink liquid reservoir;

a capping member engaged in said opening formed in said ceiling wall of said ink liquid reservoir; and a thin gap formed between said capping member and said ceiling wall of said ink liquid reservoir.

4. The ink jet system printer of claim 3, wherein said capping member is made of porous material.

5. The ink jet system printer of claim 4, further comprising a flat plate disposed in said ink liquid reservoir in order to prevent the ink liquid from reaching said opening.

6. The ink jet system printer of claim 5, wherein said flat plate is integral with said capping member.

* * * * *